(12) United States Patent
Yuan

(10) Patent No.: US 7,950,592 B2
(45) Date of Patent: May 31, 2011

(54) WHOLLY WRAPPED RAILROAD CROSSTIE AND ITS MANUFACTURING METHOD

(76) Inventor: Qiang Yuan, Qingdao (CN)

(*) Notice: Subject to any disclaimer, the term of this patent is extended or adjusted under 35 U.S.C. 154(b) by 633 days.

(21) Appl. No.: 11/902,869

(22) Filed: Sep. 26, 2007

(65) Prior Publication Data
US 2008/0035747 A1    Feb. 14, 2008

Related U.S. Application Data

(63) Continuation-in-part of application No. PCT/CN2006/001685, filed on Jul. 14, 2006.

(30) Foreign Application Priority Data

Jul. 21, 2005   (CN) .......................... 2005 1 0044128

(51) Int. Cl.
  *E01B 21/00*    (2006.01)
(52) U.S. Cl. ........................................... 238/84; 238/85
(58) Field of Classification Search .................. 238/83, 238/84, 85, 86, 87, 88, 89, 90, 91, 92, 93, 238/95, 96, 97
  See application file for complete search history.

(56) References Cited

U.S. PATENT DOCUMENTS

| 4,083,491 A | 4/1978 | Hill ................................. 238/98 |
| 4,150,790 A | 4/1979 | Potter ............................. 238/83 |
| 4,416,419 A * | 11/1983 | Ohno ............................. 238/89 |
| 5,238,734 A | 8/1993 | Murray ......................... 428/292 |
| 6,179,215 B1 * | 1/2001 | Shea ............................... 238/29 |
| 6,659,362 B1 * | 12/2003 | Hallissy et al. ................ 238/83 |
| 6,821,631 B2 * | 11/2004 | Grantham et al. ............ 428/453 |
| 2004/0112975 A1 * | 6/2004 | Leon ............................... 238/84 |

FOREIGN PATENT DOCUMENTS

| CN | 99815337 | 4/2005 |
| DE | 29 51 272 | 7/1981 |
| WO | 00/28144 | 5/2000 |
| WO | 2007/009362 | 1/2007 |

* cited by examiner

*Primary Examiner* — Mark T Le
(74) *Attorney, Agent, or Firm* — Jacobson Holman PLLC

(57) ABSTRACT

A wholly wrapped railroad crosstie comprises an inner core and an outer casing that is made of deformable composite materials. The outer casing is molten and integrally united with and attached to the inner core as a whole when it is formed. The outer casing completely covers the inner core. There's no seam on the crosstie at all. So it successfully avoids the separation and friction of the crosstie. It greatly increases the reliability and service life of the crosstie, and reduces the cost of maintenance.

5 Claims, 7 Drawing Sheets

WHOLLY WRAPPED RAILROAD CROSSTIE AND ITS MANUFACTURING METHOD

CROSS-REFERENCE TO RELATED APPLICATION(S)

The present invention is a continuation-in-part application of the International Application No. PCT/CN2006/001685 filed Jul. 14, 2006 and published in Chinese, which claims the benefit of Chinese Application No. 200510044128.9 filed Jul. 21, 2005.

FIELD OF THE INVENTION

The present invention relates to a railroad crosstie and a method of making the same.

BACKGROUND OF THE INVENTION

Railroad crossties have been made almost exclusively of wood from the beginning of the railroad age. The wooden crossties are held in place by ballast rocks and the rails are secured to the crossties by crosstie plates and spikes.

Because of the nature of timber, the wooden crossties accept and hold spikes, so that the rail and crosstie plate fastening systems can be secured to the crossties. This is the main advantage of the wooden crossties. In addition, a wood crosstie will flex under load. The resulting flexing is beneficial only in that it helps to provide for a softer ride. However, a wooden crosstie is susceptible to damages caused by exposure to sunlight, wind and rain. Thus, it easily deteriorates and ages, which shortens its service life. Therefore, it must be replaced regularly. This increases the cost of replacement and maintenance. Because forest resources are becoming scarce, it is necessary to search for alternative material instead of wood to make crossties.

To overcome the disadvantages of the wooden made crosstie, concrete crossties have been developed. However, conventional concrete crossties are too hard to use conventional and standard fastening systems (tie plates and spikes). Concrete crossties use pre-casted fasteners that are attached during the curing stage in the crosstie manufacturing process. Furthermore, each crosstie must be individually loaded and obstructed from the mold. At first glance, it would appear that the concrete crossties, since they are stiff and non-flexible, would be advantageous and provide a stiffer track module, improved lateral stability and gauge control, increased rail life, and greater locomotive fuel economy. However, what appeared to have been a significantly lower maintenance cost due to the lack of "pumping" of the ballast rock, has actually become another maintenance cost. The concrete crosstie is so hard that it pulverizes the ballast rock beneath it, which brings adversely effects the train operation. Thus, the ballast rocks need to be periodically replaced. More importantly, the concrete crossties provide a stiff and hard driving system without good shock absorption function, which limits the speeding up of trains.

Subsequently, railroad crossties made of material other than wood have been proposed. For example, U.S. Pat. No. 5,238,734 to Murray discloses a railroad crosstie made from a mixture of recycled tire fragments and an epoxy mixture. Other patents disclosing railroad crossties made out of composite materials include U.S. Pat. No. 4,150,790 (Potter) and U.S. Pat. No. 4,083,491 (Hill). Although crossties made out of composite materials provide significantly longer life than conventional wooden crossties, it has not been possible to provide composite crossties that are durable enough to withstand the heavy repeated loads of main line railroad tracks. Both wooden and composite railroad crossties tend to pump ballast rock away from the rails, thus requiring frequent reballasting.

A new type of composite crosstie disclosed by Chinese patent No. 99815337.0 was developed to maintain the advantages and to overcome those disadvantages of crossties such as wooden crosstie, concrete crosstie and the crosstie purely made of composite materials. The composite railroad crosstie is composed of two main parts: one part is an outer casing made of composite materials that are divided into an upper section and a lower section; the other part is a reinforcing inner core. The interface of the upper and the lower sections of the outer casing are attached together by urethane adhesive which is also used in aviation and is available from Mao Tao Corp. Then they are secured together by wooden screws, and special caps are glued on both ends of the crossties. The reinforcing inner core comprises three parts. The exterior part is a steel sheet shaped like "W" or "H" and stuffed with concrete in order to prevent concrete from being pulverized by long time impact of trains. The reinforcing inner core ensures the integral intensity of a crosstie. In order to fasten the rails to the crosstie by forcing spikes, inserts are placed into the core that are made out of the same composite material from which the casing is made, so that spikes can be driven through the casing, the apertures, and into the inserts.

On one hand, the high intensity and flexibility of the outer casing bring cushion and shock absorption to the heavy impact of trains. It may replace timber and it's more durable than timber. The materials of the outer casing are recycled plastic and recycled rubber that is not degrading. It can not only reduce environmental impact but also protect forest. On the other hand, rigidity of the concrete crosstie and the ballast rocks are so high that the ballast rocks get crushed by constant friction and vibration, which reduces the safety factor of railroad. Therefore, periodically manual maintenance used to be done. This results in further cost. In this aspect, the special material and structure of the outer casing of a composite crosstie make the ballast rock embedded in the outer cast by certain depth so as to reduce the relative movement between the crosstie and ballast rocks. It solves the problem of the concrete made crosstie.

However, the technical solution of the Chinese Patent No. 99815337.0 also has very clear disadvantages. It is illustrated in FIG. 7 that the outer casing 19 is composed of top and lower parts and there is a line between the two parts, which is the seam 19-1. An appropriate glue is applied to the interfaces of the two parts, and then the wooden screws 17 are used to fasten the two parts. The wooden screws are almost nothing to the force that the crosstie can bear. The wooden screws are very easy to be destroyed and the glue on the interfaces of the two parts is easy to be broken so that the top and the lower parts may mismatch or separate. Even a small mismatch would keep the two parts separate. Therefore, it increases the probability of destruction. Because there is certain space between the outer casing and the inner casing when the crosstie is subject to lateral force, such space exacerbates the abrasion and separation of the crosstie as a result of greatly reducing in reliability and service life and even causing the cracks and damage to the outer casing of the crosstie.

In addition, the manufacture techniques of the above composite crosstie have drawbacks. The production and assembly of the outer casing are separately done in two production lines, which results in extra investment on the equipment, more complicated procedure, more labor as well as a lower production rate.

The object of the invention is how to overcome the shortcomings as mentioned above.

THE SUMMARY OF THE INVENTION

The present invention discloses a new type of wholly wrapped railroad crosstie and its manufacturing method. The present invention solves the severe problems that exist in the design of the current composite railroad crosstie such as the abrasion, the lower reliability, short service life and accident cracks.

In order to tackle the problems mentioned above, the technical solution of the present invention introduces a new type of wholly wrapped railroad crosstie. It comprises an inner core and an outer casing that is made of deformable composite materials, characterized in that, the wholly wrapped outer casing is molten and attached to and united together with the inner core to form an integrated body when the outer casing is formed.

Furthermore, according to the present invention, the inner core as mentioned above comprises a supporting framework and inserts which fill the framework.

A further object of the present invention is to provide a railroad crosstie with the following characteristics:

The inner core can be a used wooden crosstie, where the cross section size of the used crosstie is proportionally reduced and the rotten, cracked and spike hole parts are repaired.

In addition, the inner core can be made of compressed sheets of woodchips, or composite material of recycled plastic and woodchips, where urethane adhesive is used to glue the composite material together.

Furthermore, a new wood crosstie of a reduced size can be used as the inner core. This will save about 50% of the amount of wood used in a regular wooden crosstie.

According to a still further aspect of the present invention, the outer casing is made of recycled rubber powder or wasted paint and recycled plastic. The recycled powder that is produced from grinding wasted rubber accounts for 30 to 70 vol. % based on the entire volume of outer casing. The wasted rubber includes used tires, rubber soles and vulcanized rubber. The granularity of the wasted rubber is 5 to 80 mesh. The recycled plastics are made into pieces and particles or, if necessary, through a repeated granularization process.

According to a still further aspect of the present invention, the recycled plastics are polyethylene, polypropylene, polystyrene or polyester.

According to a still further aspect of the present invention, the framework is a steel plate that is folded into W cross-section shape or H cross-section or made into two tubular pipes.

According to a still further aspect of the present invention, the reinforcing inserts include concrete and composite inserts. same materials used in making the outer casing are also used in producing reinforcing inserts.

The manufacturing method of the crosstie of the present invention is as follows:

1. As an inner mold, the inner core is towed by a traction machine to the molding machine on the base for wrapping;
2. The mixtures for the outer casing are prepared according to the following procedures:
    A. The granularity of the recycled rubber powder should be 5 to 80 mesh, Recycled plastics are made into pieces and particles or, if necessary, through a repeated granularization process;
    B. Mixing recycled rubber powder which is 30-70% based on the entire volume of the composite materials;
    C. After being mixed, the composite materials are being transferred to the extruder by the screw pole. During the compressing, those materials are heated from 120° C. to 240° C.;

After the acceleration of the gearbox, the power of motor is transferred to the extruding screw that rotates to melt and extrude the materials;

The inner core is preheated in order to make its steel framework more closely covered by and adhered to the materials;

3. When the inner core is being pulled through the head of the molding machine, the material that has just been extruded would fully cover and wrap the inner core and form the wholly wrapped outer casing molten and integrally attached to the inner core;
4. After cooling and shaping, the crosstie is to be severed;
5. Finally, a glue is applied on two ends and then caps seal them or rubber or/and plastic is sprayed on those ends.

Based on the total weight of the composite materials, at most 5 percent of additive should be added to those materials mentioned above. The additive is at least one of antioxidant and/or urethane. The types of antioxidant said above are UV531, HA88, 1010, 1076, 168.

In comparison with the prior-art technology, the present invention has following advantages and positive effects.

1. The outer casing completely covers the inner core as a whole. There's no seam in the crosstie at all. Therefore, it successfully avoids the separation and friction problems of the previous crosstie. It greatly increases the reliability and service life of the crosstie. In addition, it reduces the cost of maintenance.
2. Because the outer casing directly wraps around the inner core through a melting and attaching process, the procedure in its production is simplified and the assembly of the outer casing is no longer needed. So it raises productivity and reduces the labor cost.
3. The materials of the outer casing, such as used rubber and plastic, are all recycled materials. It uses a large amount of industrial wastes and domestic wastes. Therefore, it greatly contributes to protection of the environment and forests as well as preservation of timber.

BRIEF DESCRIPTION OF THE DRAWINGS

FIG. 6-1 is the side cross-sectioned view that shows how the materials are flowing in the head of the molding machine of this invention;

FIG. 6-2 is the straight severed cross-sectioned view that shows how the materials are flowing in the head of the molding machine of this invention;

Figure 1:
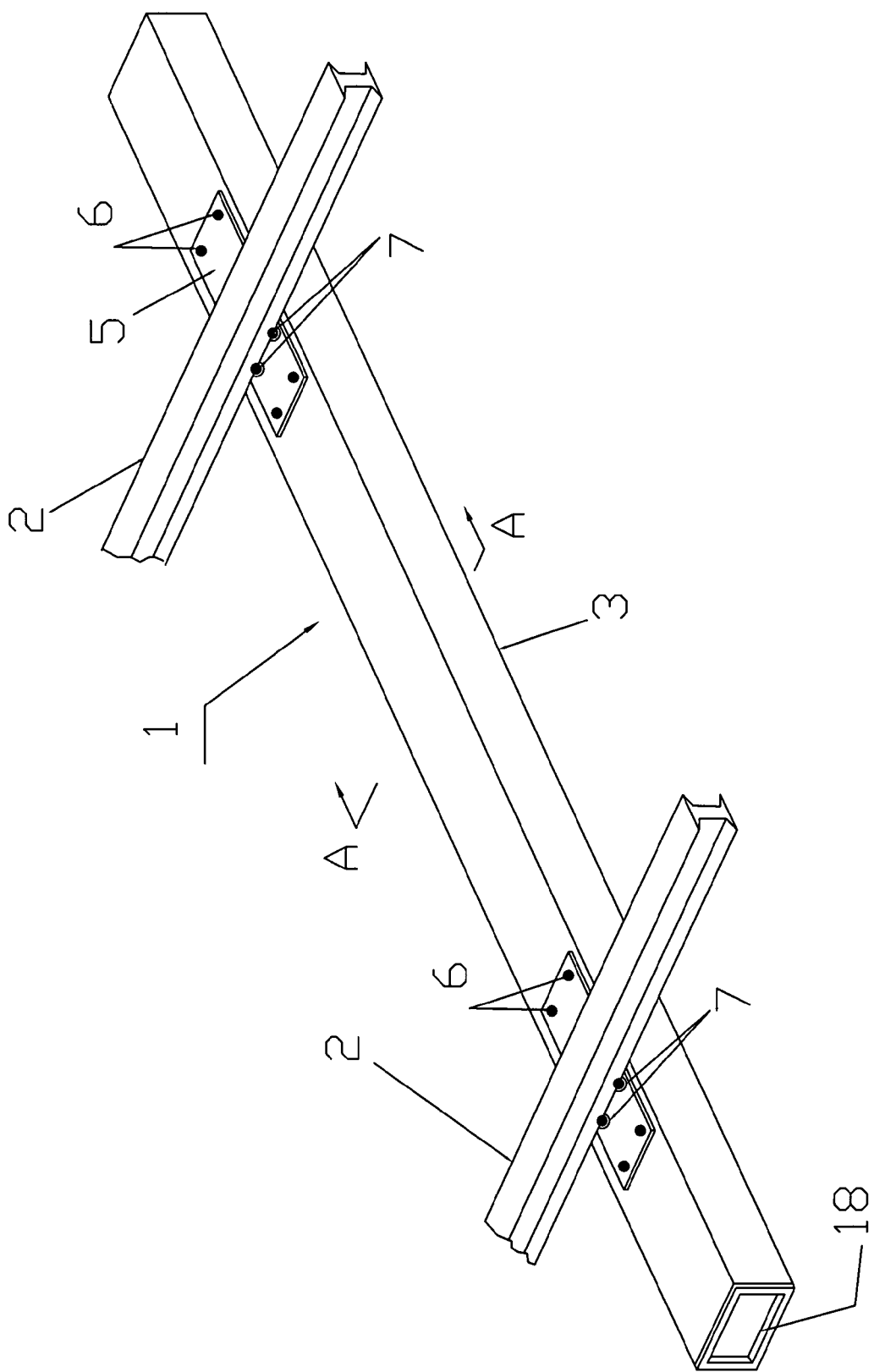
FIG. 1 is a front perspective view that shows the wholly wrapped railroad crosstie and how it supports the rails.

In the above drawings, these reference numerals referring to different parts have the following meanings. No. 1 is the wholly wrapped railroad crosstie; No. 2 is rails; No. 3 is an outer casing; No. 4 is an inner core; No. 4-1 is a supporting framework; No. 4-1-1 is a chamber of the framework; No. 4-2 is reinforcing inserts; No. 4-2-1 is concrete inserts; No. 4-2-2 is composite inserts; No. 5 is a crosstie plate; No. 6 is fasteners; No. 7 is spikes; No. 8 is a side plate; No. 9 is a top plate; No. 10 is a head of the molding machine; No. 11 is a base; No. 12 is a feeding pipe; No. 13 is a hopper; No. 14 is a gearbox; No. 15 is a screw pole No. 16 is an extruder; No. 17 is a wooden screw; No. 18 is caps; No. 19 is a separate body casing; No. 19-1 is a seam.

DETAILED DESCRIPTION OF THE INVENTION

As showed in FIG. 1, reference numeral 1 represents the railroad crosstie made according to the principle of the present invention. It supports substantially parallel rails by means that is generally known to a skilled artisan. The crosstie 1 includes the outer casing 3 that is formed in a way to completely cover the inner core 4. During the manufacturing process, the outer casing material 3 melts and covers on the inner core 4 as a single integrated object. Therefore, there is not any space between the outer casing 3 and the inner core 4. In this very example, the thickness of the outer casing is 25.4 mm but it can also be changed according to different requirements.

The supporting areas for the rails 2 are set up on the crosstie plate 5 of the outer casing 3. The crosstie plates 5 are firmly secured to the crosstie 1 by fasteners 6. The conventional spikes 7 are driven through the apertures of the crosstie plates 5 into the crosstie 1 securing the rails 2 to the crosstie 1. The caps 18 cover both ends of the crosstie 1.

The materials of the outer casing 3 include recycled rubber powder and recycled plastics in which the amount of recycled rubber powder accounts for 30 percent to 70 percent based on the entire volume of the outer casing. Used rubber materials are obtained from used tires, recycle plastics and sulfurated rubber. The particles of recycled rubber powder should be 5 to 80 meshes. The recycled plastics are made into pieces and particles or, if necessary, through repeated granularization.

Because of the high intensity and flexibility of the material, the ballast rocks actually embeds itself into the composite crosstie, which prevent the crosstie from moving laterally when it receives pressure. Therefore, it increases the safety of the railroad.

Figure 2:
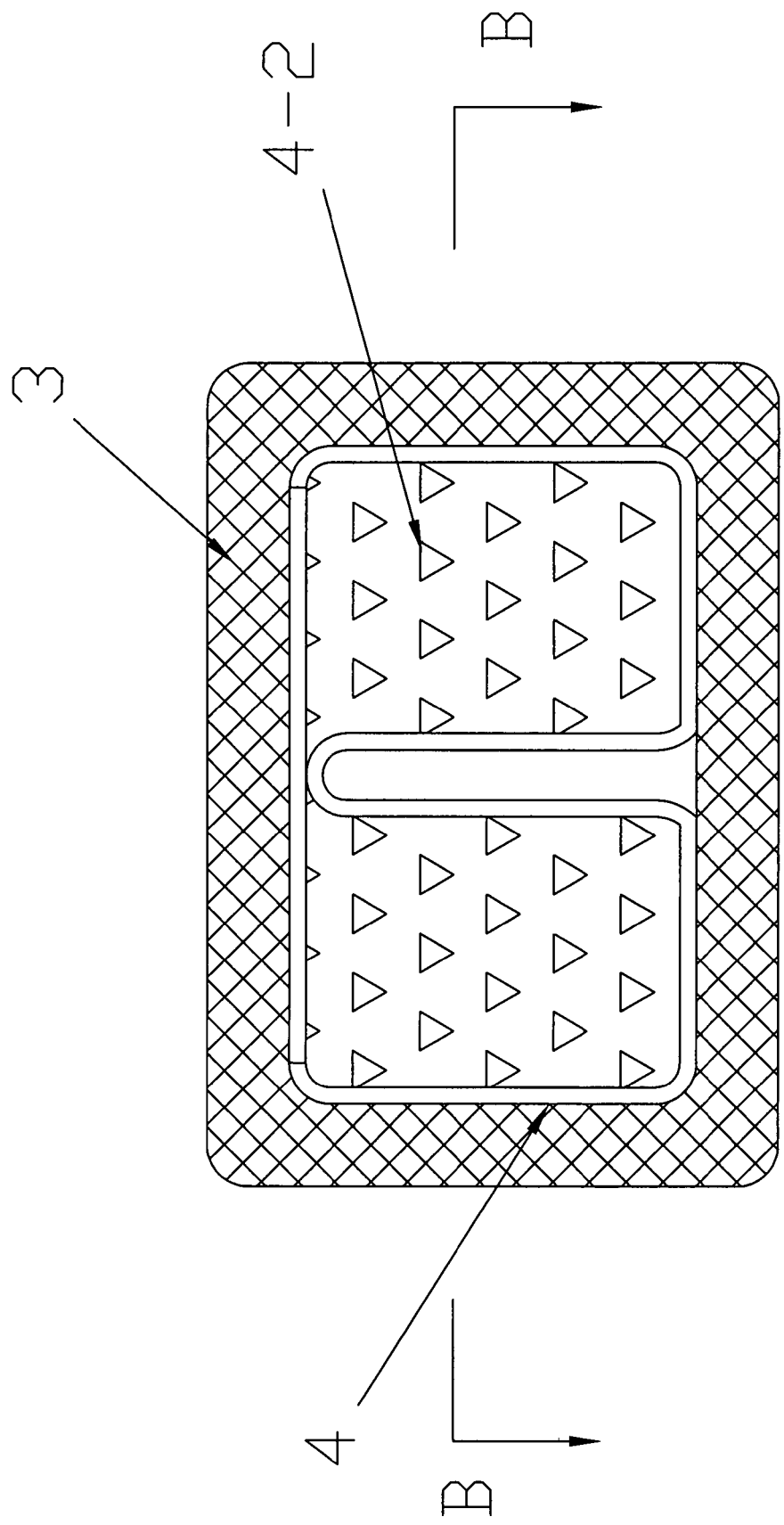
FIG. 2 is a transverse cross sectioned view taken substantially along lines A-A of FIG. 1.

As clearly showed in FIG. 2, the reinforcing inserts 4-2 of inner core 4 are stuffed into the supporting framework 4-1.

In this very case, the supporting framework 4-1 is folded into a "W" cross section shape. The thickness and the shape of the steel plate according to different rigidity can certainly be changed. The framework can also be folded into H cross-section shape or two tubular pipes.

Figure 3:
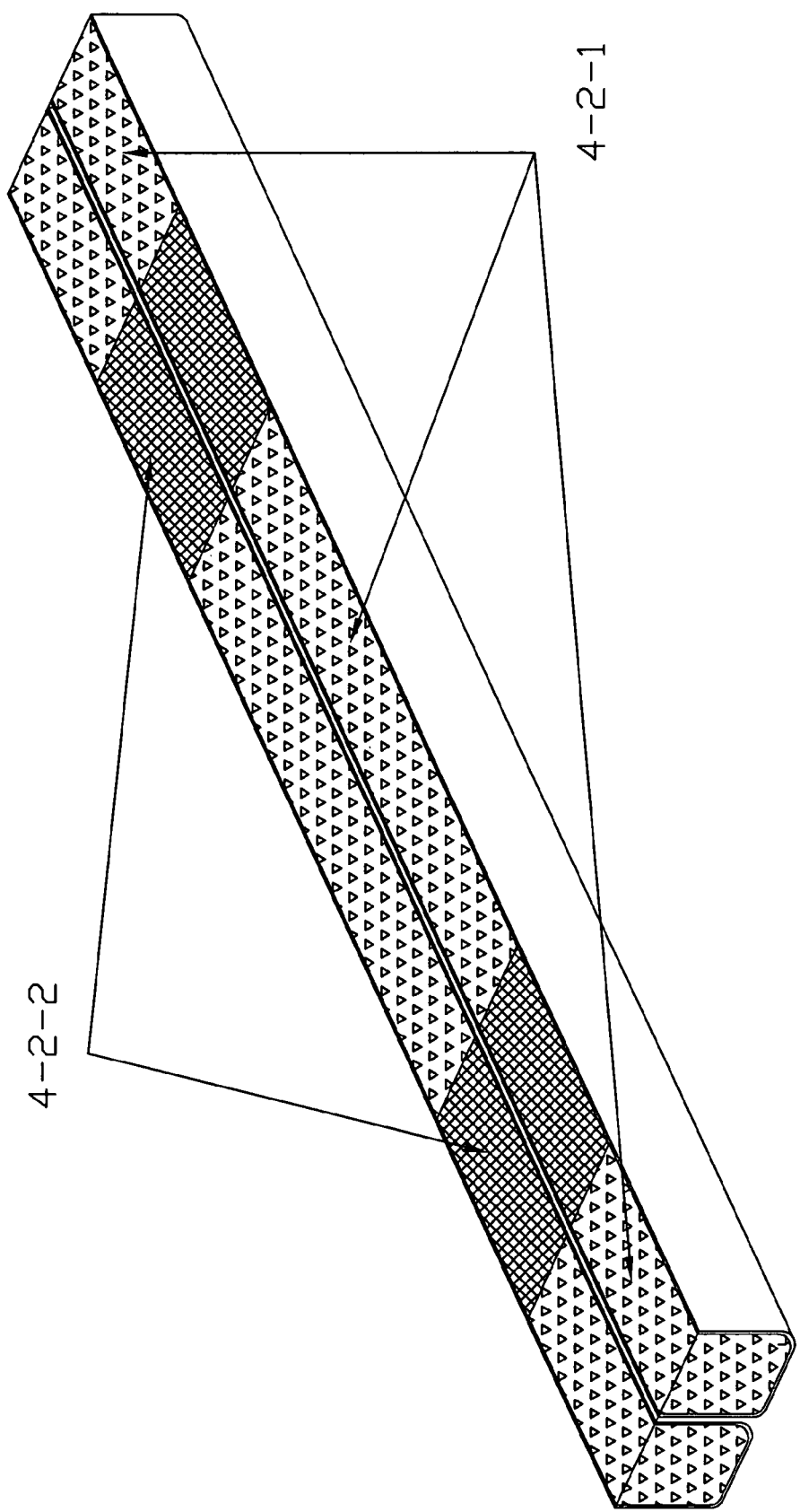
FIG. 3 is a cross sectional view of portion taken substantially along lines B-B of FIG. 2.

As showed in FIG. 3, it is very clear that reinforcing inserts 4-2 include composite inserts 4-2-2 and concrete 4-2-1. The materials of the composite inserts 4-2-2 are just the same as the outer casing 3. The spikes 7 are driven into the composite inserts 4-2-2 to make rails 2 firm. The concrete inserts 4-2-1 are divided into three parts that are put into the chamber of supporting framework 4-1 and formed after cooling.

The concrete 4-2-1 of the reinforcing inserts 4-2 is preferably a fast drying concrete material capable of being pumped into the crosstie. It is often called "flowable concrete" or replaced by material known as fast drying polyurethane. Cement concrete can also be chosen if required. The reinforcing inserts increase the stiffness of the crosstie 1 and firmly secure the rails 2.

Figure 4:
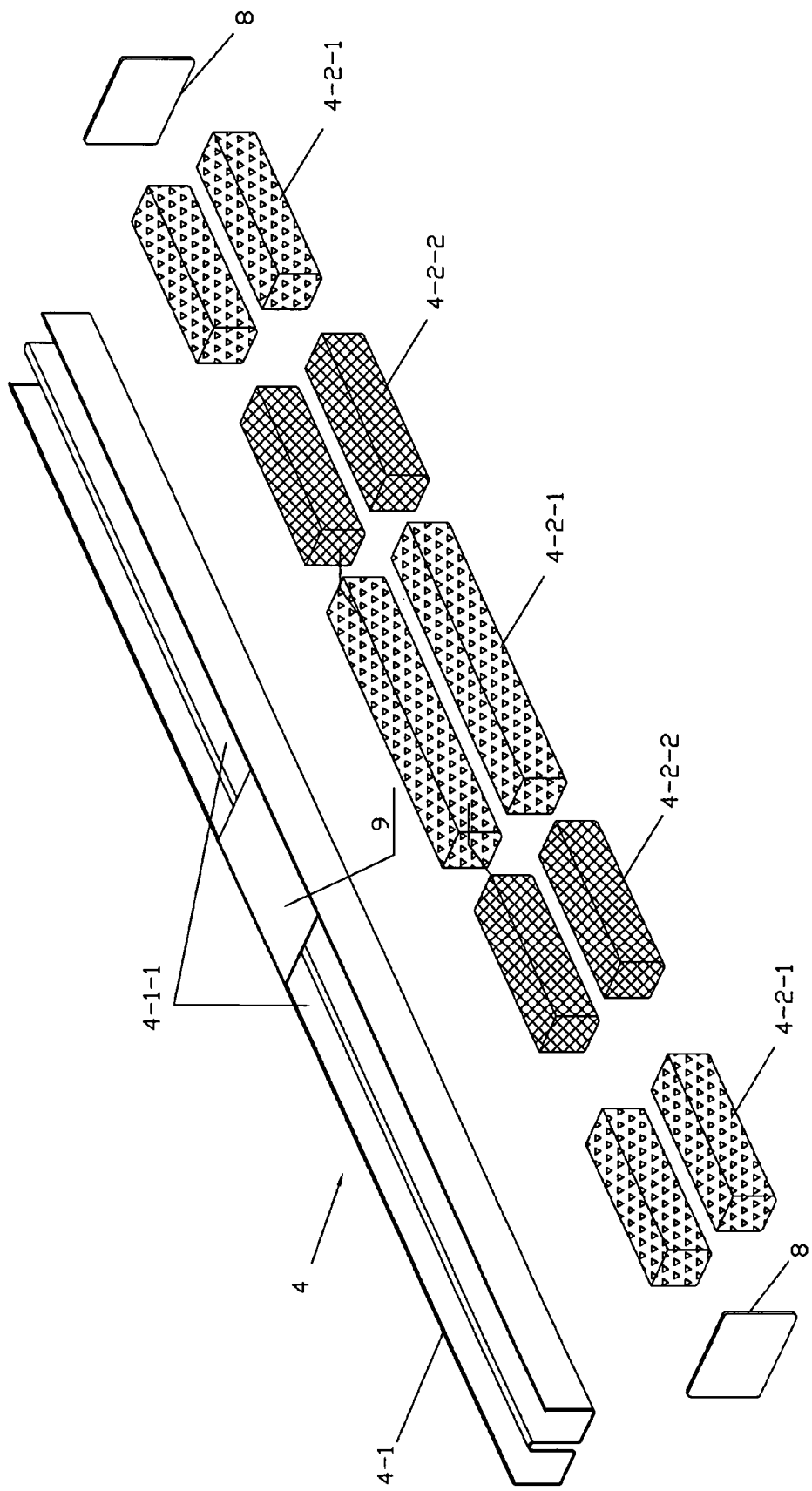
FIG. 4 is an exploded view that shows the inner core of the crosstie illustrated in FIG. 3.

FIG. 4 is the diagrammatic representation that illustrates the inner core. The framework 4-1 is made of a steel plate that is folded into "W" cross section shape. Its two sides are welded with plates 8 and its top is welded with plate 9 so as to improve the stiffness and keep the shape of the framework 4-1.

The composite inserts 4-2-2 and concrete 4-2-1 are to be placed in the chamber of the framework 4-1-1. The position to place them is showed in FIG. 3.

The inner core can be a used wooden crosstie, where the cross section size of the used crosstie is proportionally reduced and the rotten, cracked and spike hole parts are repaired to satisfy the size requirement.

In addition, the inner core can be made of compressed sheets of woodchips. The sheet is made through mixing woodchips and adhesives according to certain ratio. Alternatively, the inner core can be made of composite material of recycled plastic and woodchips. The urethane adhesive is used in the above sheet or composite material.

Furthermore, a new wood crosstie of a reduced size can be used as the inner core. This will save about 50% of the amount of wood used in a regular wooden crosstie.

Figure 5:
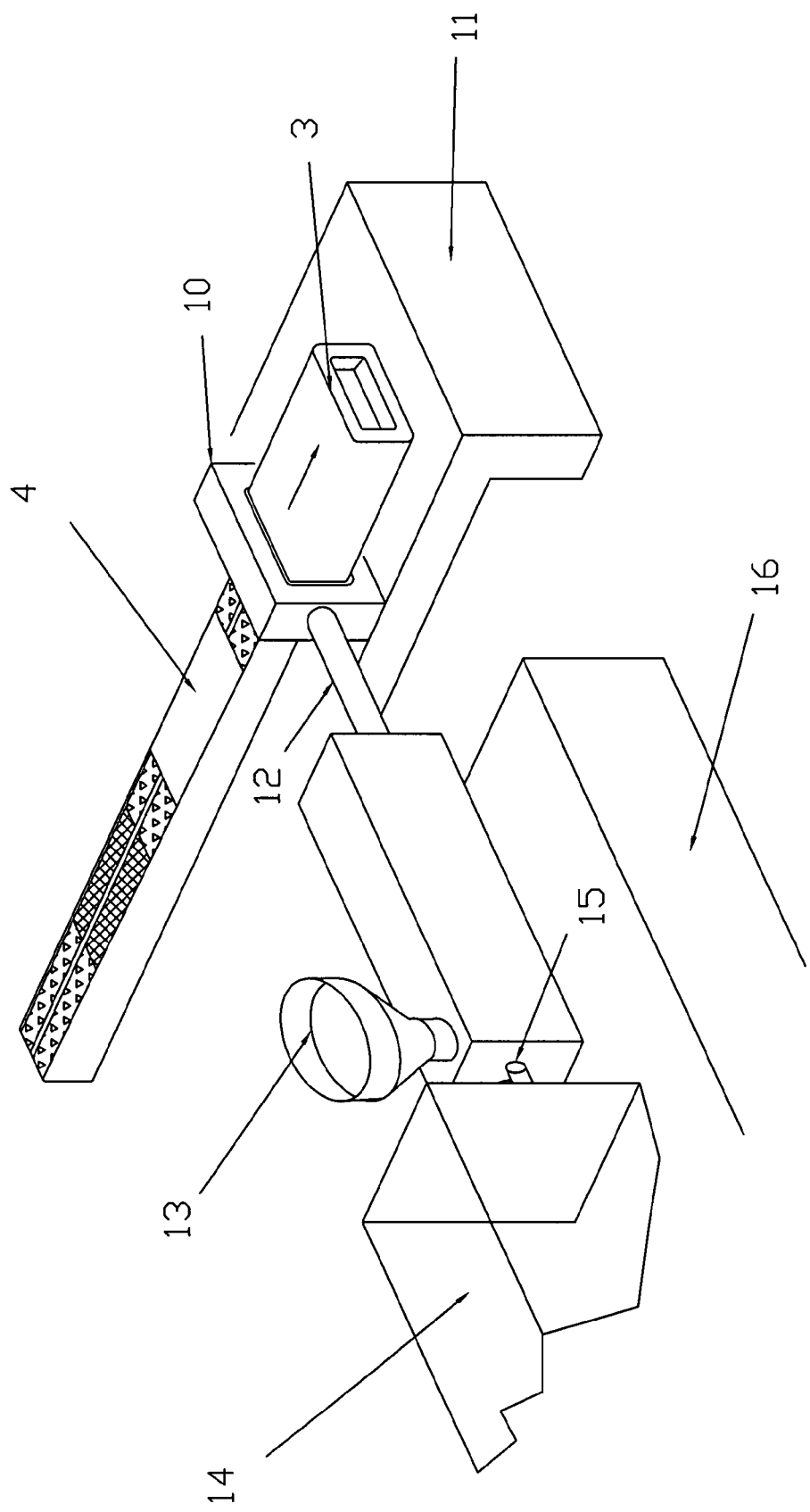
FIG. 5 shows how the outer casing is extruded from the extruder.

FIG. 5 mainly illustrates the extrusion process of making the outer casing 3. The head of the molding machine 10 is attached firmly to the base 11. The feeding pipe 12 connects the head of the molding machine 10 and the extruder 16. As the figure shows, the composite materials come into the hopper 13. The power supplied by the motor is accelerated by the gearbox 14 and then transferred to the screw pole 15. The screw pole 15 rotates and extrudes the materials. At the same time, the inner core 4 is pulled by the traction machine. An assistant machine is not shown as it is known to a skilled artisan in this field. Through the head of the molding machine 10, the materials are extruded fully covering around the inner core. Then the crosstie goes through the process of cooling and severing. The last step is to apply glue on two ends, and then attach two special caps 18 onto the ends. The other way to close the ends is to put rubber and plastics on them by spraying or applying a glue.

Figures 2, 6:
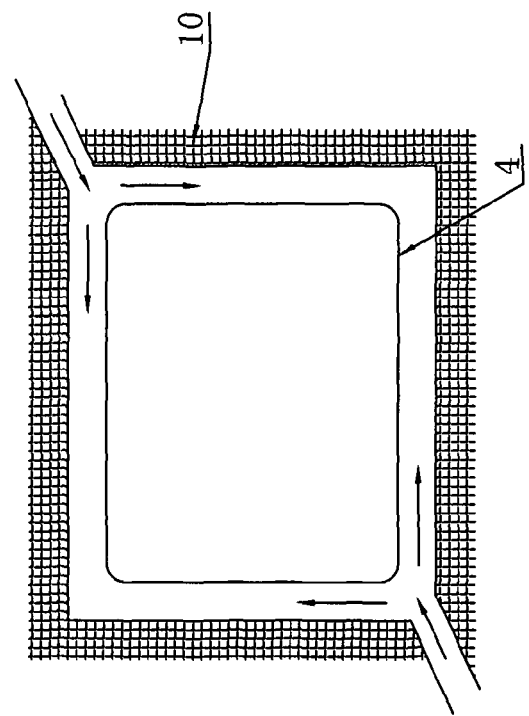
Figures 1, 6:
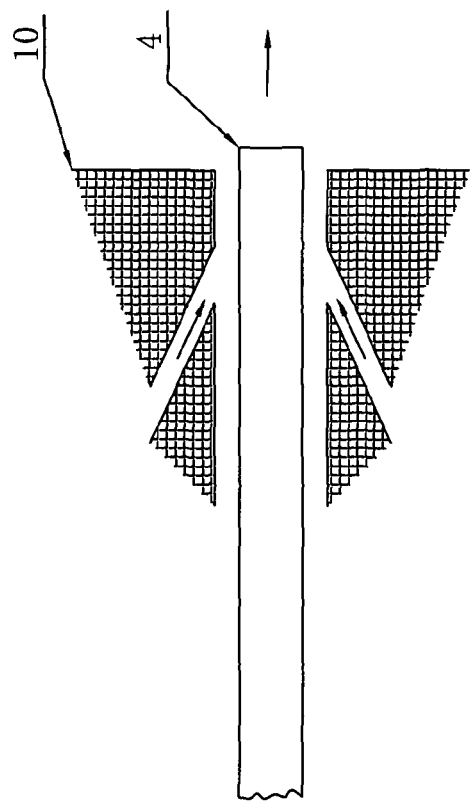
Figure 7:
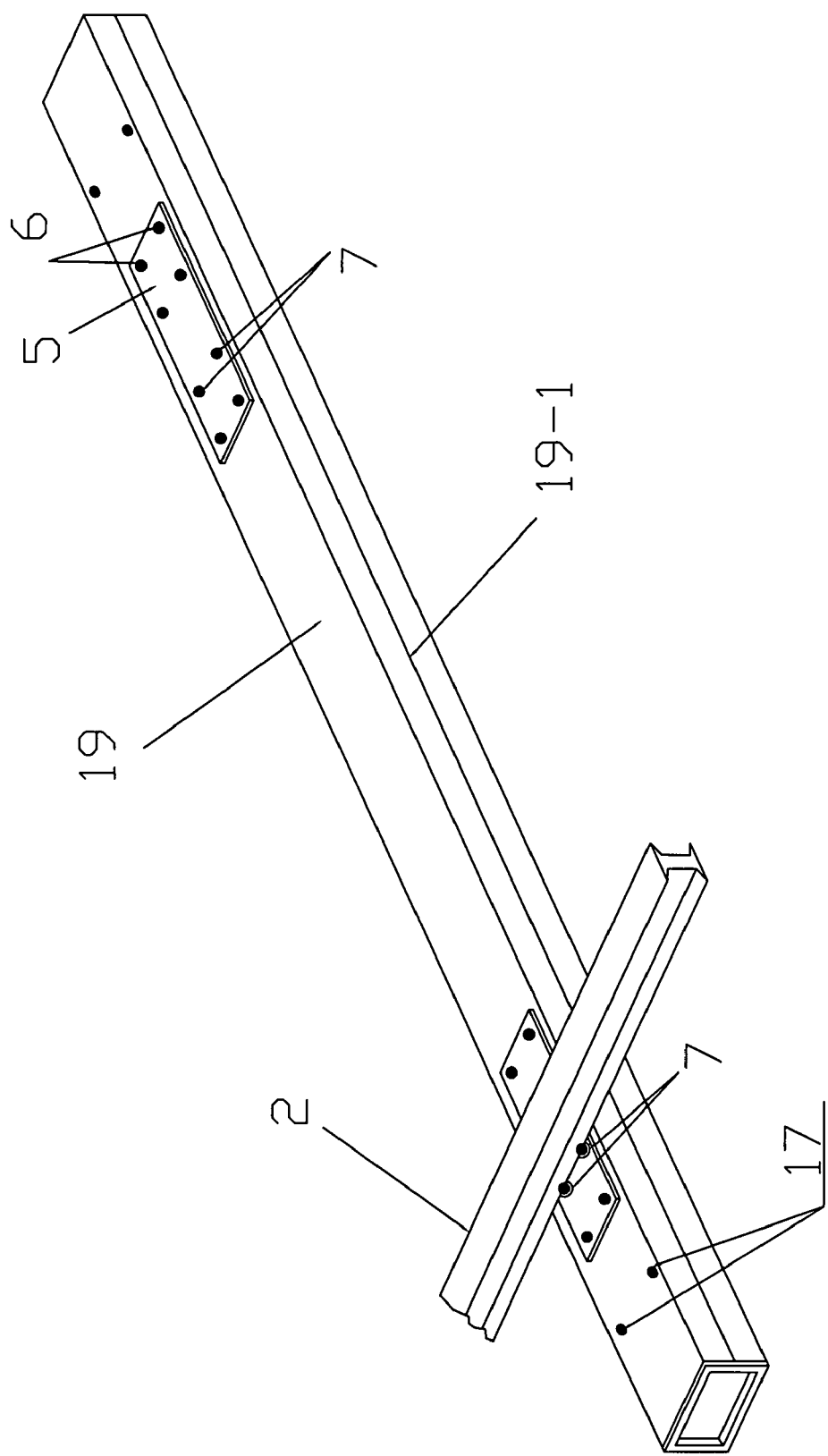
FIG. 7 is front perspective view of the prior art that shows the composite railroad crosstie and how it supports the railroad.

As FIGS. 6-1 and 6-2 show, after being extruded by the extruder 16, the materials flow into the head of the molding machine 10. Those arrows show direction in which they are going.

The details of the process are as follows:
1. The prepared inner core that serves as the inner mold is pulled by the traction machine to the molding machine that is located on the base;
2. The composite materials of the outer casing are prepared according to the following steps:
   A. The particles of recycled rubber powder should be 5 to 80 mesh. The recycled plastics are made into pieces and particles or by reproducing particles;
   B. Mixing recycled rubber powder which is 30-70% based on the entire volume in the composite materials;
   C. After being mixed, the composite materials are transferred to the extruder by the screw pole. During the compressing, those materials are heated from 120° C. to 240° C.;

After the acceleration of the gearbox, the power supplied by a motor is transferred to the screw that rotates to heat and extrude the materials;

Preheating of the inner core allows its steel framework to be closely covered by the materials;

3. When the inner core is being pulled through the head of the molding machine, the material that has just been extruded would fully cover the inner core, thus forming the wholly wrapped outer casing;
4. After the cooling and shaping, the crosstie is severed;
5. Finally, a glue is applied on two ends, and then caps are stuck to them or rubber and/or plastic is sprayed on them.

Based on the total weight of the composite materials, at most five percent of additive should be added to those materials mentioned before. The additive is selected from antioxidant and/or urethane.

The types of antioxidant are UV 531, HA88, 1010, 1076, 168.

It is to be understood that the examples of this invention herewith shown and described are to be taken as a preferred example of the same, and that this invention is not to be limited to the accompanying drawings or described in this specification as various changes in the details may be resorted to without departing from the spirit of the invention.

The invention claimed is:

1. A wholly wrapped railroad crosstie comprising an inner core and an outer casing covering said inner core, said outer casing being made of composite materials, wherein said outer casing entirely wraps around said inner core and said outer casing when molten is attached to said inner core to form an integrated crosstie during a forming process,
   wherein the outer casing is without a seam;
   wherein there is no space between the outer casing and the inner core; and
   wherein said inner core comprises a supporting framework and reinforcing inserts that are contained within said supporting framework;
   wherein said reinforcing inserts are made of a combination of concrete inserts and composite inserts that are made of the same materials as said outer casing.

2. The crosstie as defined in claim 1, wherein said supporting framework is a steel plate that is folded into "H" cross section shape or "W" cross section shape or said supporting framework is two tubular beams; and
   wherein said supporting framework includes end plates secured to sectional ends of supporting framework and a top plate secured to a lateral side the supporting framework.

3. The crosstie as defined in claim 1, wherein the concrete inserts are divided into three or more parts that are separated by at least two spaced apart composite inserts.

4. A wholly wrapped railroad crosstie comprising an inner core and an outer casing covering said inner core, said outer casing being made of composite materials, wherein said outer casing entirely wraps around said inner core and said outer casing when molten is attached to said inner core to form an integrated crosstie during forming process,
   wherein the outer casing is without a seam;
   wherein there is no space between the outer casing and the inner core;
   wherein said outer casing is made of recycled rubber powder and recycled plastics, in which said recycled rubber powder accounts for 30 percent to 70 percent of the entire volume of the outer casing and said rubber powder being made of used rubber materials including used tires, rubber soles and sulfurated rubber materials, the granularity of the recycled rubber powder being 5 to 80 mesh, the recycled plastic being made into pieces and particles;
   wherein said recycled plastics are selected from the group consisting of polyethylene, polypropylene, polystyrene and polyester;
   wherein said supporting framework is a steel plate that is folded into "H" cross section shape or "W" cross section shape or said supporting framework is two tubular beams; and
   wherein said supporting framework includes end plates secured to sectional ends of the supporting framework and a top plate secured to a lateral side of the supporting framework;
   wherein, based on the total weight of the composite material, at most five percent of an additive is added to the material, and said additive is an antioxidant and/or urethane; and
   wherein the antioxidant is selected from the group consisting of UV 531, HA88, 1010, 1076, and 168.

5. The crosstie as defined in claim 4, wherein said recycled rubber powder accounts for 30% of entire volume of the outer casing.

* * * * *